(12) United States Patent
Shimanuki et al.

(10) Patent No.: US 6,471,195 B2
(45) Date of Patent: Oct. 29, 2002

(54) HUMIDIFIER FOR USE WITH A FUEL CELL

(75) Inventors: Hiroshi Shimanuki; Toshikatsu Katagiri; Motohiro Suzuki; Yoshio Kusano, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 7 days.

(21) Appl. No.: 09/764,393

(22) Filed: Jan. 19, 2001

(65) Prior Publication Data

US 2001/0009306 A1 Jul. 26, 2001

(30) Foreign Application Priority Data

Jan. 19, 2000 (JP) ........................................ 2000-010968

(51) Int. Cl.$^7$ ................................................. B01F 3/04
(52) U.S. Cl. ......................... 261/44.1; 261/53; 261/104
(58) Field of Search ............................... 261/41.3, 44.1, 261/53, 104; 96/8; 95/52

(56) References Cited

U.S. PATENT DOCUMENTS 3,735,559 A * 5/1973 Salemme ........................ 95/52
5,176,725 A * 1/1993 Puri et al. ........................ 96/8

FOREIGN PATENT DOCUMENTS

| JP | A-7-71795 | 3/1995 |
| JP | 07-245116 | * 9/1995 |

* cited by examiner

Primary Examiner—C. Scott Bushey
(74) Attorney, Agent, or Firm—Arent Fox Kintner Plotkin & Kahn, PLLC (57) ABSTRACT

A humidifier 21 for use with a fuel cell 1, including a plurality of combined water permeable membranes or water permeable devices 21, each of the water permeable membranes or water permeable devices generating humidified gas by flowing therein different gases with different moisture contents and by moisture exchanging between the different gases so that one dry gas with smaller moisture content is humidified with the other moist gas with larger moisture content; and flowing passage switching devices Va for optionally switching flowing passages Ca of the dry gas. The flowing passage switching devices Va switches the flowing passage Ca in accordance with a required amount of the humidified gas so as to selectively use particular water permeable membranes or a particular water permeable device 21 from among the plurality of water permeable membranes or water permeable devices 21.

9 Claims, 8 Drawing Sheets

FIG.13
PRIOR ART (PRESSURE OF HUMIDIFIED AIR SUPPLIED TO FUEL CELL)

(REQUIRED AMOUNT OF HUMIDIFIED AIR)

HUMIDIFIER FOR USE WITH A FUEL CELL

FIELD OF THE INVENTION

The present invention relates to a humidifier for use with a fuel cell, and more particularly to a humidifier utilizing water permeable membranes.

BACKGROUND OF THE INVENTION

Fuel cell systems, especially solid polymer fuel cell systems are widely known as a power source for electric vehicles. In such fuel cell systems, a humidifier is used to moisture-exchange off gas, viz. moist gas discharged from a fuel cell, between its moisture and air as a dry gas, and to generate humidified air or humidified gas. Preferably, a humidifier used with such fuel cell systems is of a lower power consumption type, and is required compactness with less attachment space. For this reason, among many other humidifiers, such as a supersonic humidifier, a steam humidifier, a vaporizing humidifier and a nozzle injection type humidifier, a humidifier utilizing water permeable membranes, especially hollow fiber membranes is commonly used with a fuel cell.

Figure 12:
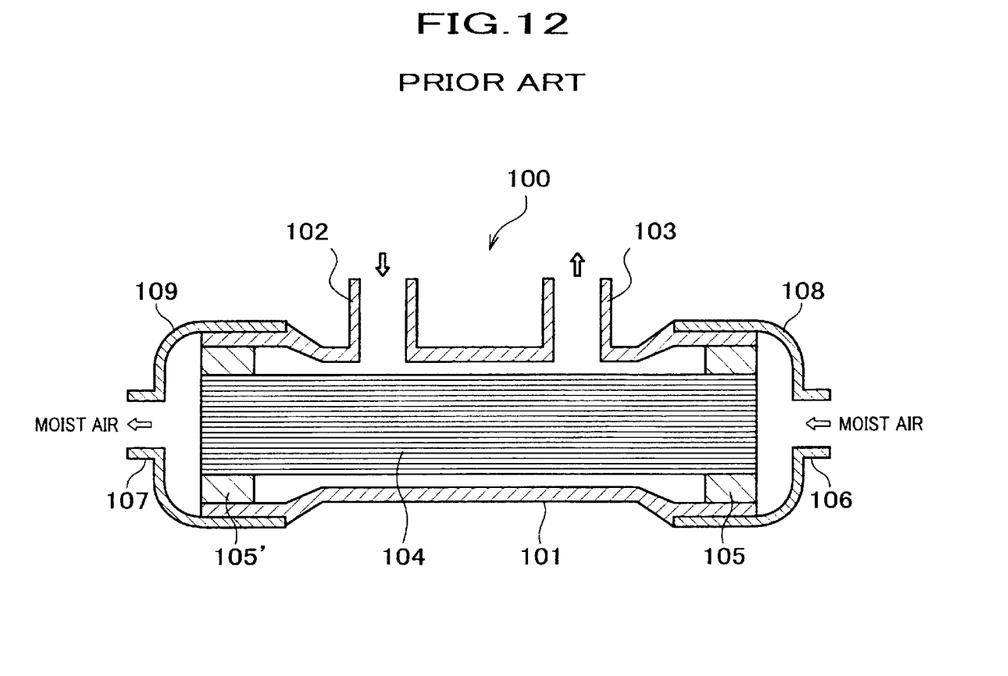
FIG. 12 is a sectional view illustrating a prior art humidifier.

A conventional humidifier utilizing hollow fiber membranes is disclosed in Japanese Laid-open Patent Publication No. HEI-7-71795. As shown in FIG. 12, a humidifier 100 comprises a housing 101, on which is provided a first inlet 102 for introducing dry air and a first outlet 103 for discharging the dry air (humidified dry air). A bundle of hollow fiber membranes 104 consisting of a number of for example 5000 hollow fiber membranes is accommodated within the housing 101.

At both ends of the housing 101, fastening members 105, 105' are provided for fixing the ends of the bundle 104 while leaving them open. Outside of the fastening member 105 is provided a second inlet 106 for introducing moist air or moist gas, and a second outlet 107 is provided outside of the fastening member 105' for discharging the moist air, moisture of which is separated and removed at the bundle of hollow fiber membranes 104. The fastening members 105, 105' are covered with a first head cover 108 and a second head cover 109, respectively. And the second inlet 106 is formed on the first head cover 108, while the second outlet 107 is formed on the second head cover 109.

In the aforementioned humidifier 100 utilizing hollow fiber membranes, the moist air introduced from the second inlet 106 passes through the hollow fiber membranes forming the bundle of hollow fiber membranes 104, and the moisture within the moist air is separated by capillary action of the hollow fiber membranes. The separated moisture moves outward of the hollow fiber membrane through a capillary tube of the membrane. The moisture-removed air is discharged from the second outlet 107.

Meanwhile, dry air is supplied from the first inlet 102. The dry air from the first inlet 102 flows outside of the hollow fiber membranes forming the bundle of hollow fiber membranes. Because the moisture separated from the moist air has moved outside of the hollow fiber membranes, the moisture humidifies the dry air. The humidified dry air is then discharged from the first outlet 103.

Figure 13:
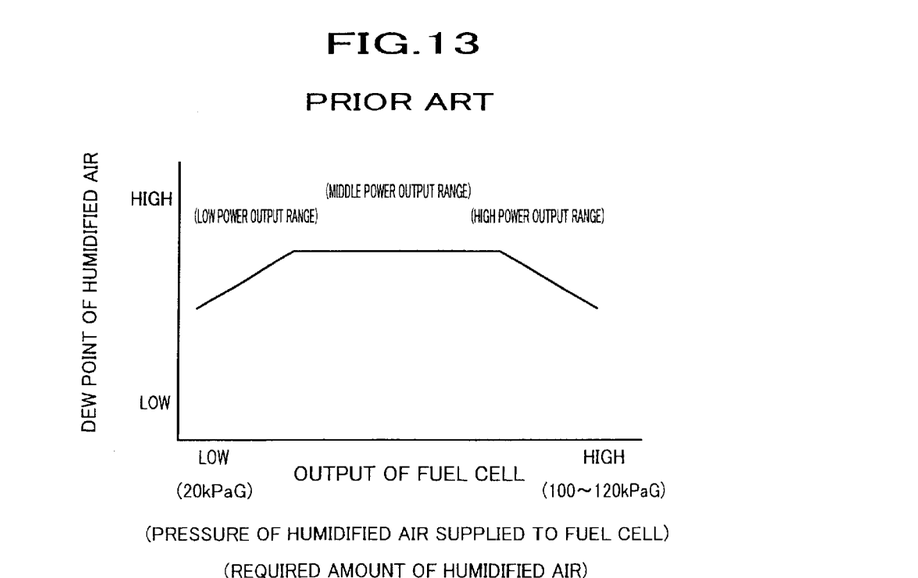
FIG. 13 is a graph explaining the humidifying characteristics of the prior art humidifier.

However, as shown in FIG. 13, the conventional humidifier 100 has humidifying characteristics, on the basis of output of the fuel cell, in which the dew point of the humidified air decreases both in a low power output range where small amount of humidified air is required and a high power output range where large amount of humidified air is required, and the dew point of the humidified air increases in a middle power output range where middle amount of humidified air is required. Because dried electrolyte membranes affect fuel cells, the humidifying process is generally carried out on the basis of the low power output range or the high power output range. Therefore, the fuel cell tends to be excessively humidified in the middle power output range. As a result of the excessive humidification, if diffusion layers or electrodes of the fuel cell are immersed in water, free flow of the gas is interrupted in the fuel cell, which leads to a drawback in that expected performance is not achieved.

In order to improve the humidifying capability of the humidifier, a large number of hollow fiber membranes are required to provide extensive surface area of the membranes. However, with increasing the number of hollow fiber membranes, dry air flowing outside of the membranes tends to arise a drift, and the dry air does not equally flow throughout the housing. Thereby, the extensive surface area of the outer surface of the hollow fiber membranes cannot be used effectively, which leads to decreased humidifying efficiency and hence to a drawback that it is impossible to increase the dew point. This can also be said to other water permeable membranes.

In view of the above, the present invention seeks to provide a humidifier for use with a fuel cell, which can supply a fuel cell with humidified gas with stable dew points at the entire range from a low power output range to a high power output range, and which can utilize the extensive outer surface area of the hollow fiber membranes.

SUMMARY OF THE INVENTION

As the result of intensive researches, the inventors eventually complete the invention by focusing the reason why the dew point of the humidified air through the humidifier has the characteristics such as shown in FIG. 13. Namely, in a low power output range of the fuel cell, the dew point of the humidified air cannot rise sufficiently, because the required amount of the humidified air is small and the operating pressure of the fuel cell is low. Meanwhile, in a high power output range of the fuel cell, the dew point of the humidified air cannot rise sufficiently, because the required amount of the humidified air is large.

According to the present invention, the objects of the invention can be accomplished by providing a humidifier for use with a fuel cell, comprising:

a plurality of combined water permeable membranes or water permeable devices, each of the water permeable membrane or water permeable device generating humidified gas by flowing therein different gases with different moisture contents and by moisture exchanging between the different gases so that one dry gas with smaller moisture content is humidified with the other moist gas with larger moisture content; and flowing passage switching means for optionally switching flowing passages of said dry gas;

wherein said flowing passage switching means switches the flowing passage in accordance with a required amount of said humidified gas so as to selectively use particular water permeable membranes or a particular water permeable device from among the plurality of water permeable membranes or water permeable devices.

In such a construction, even if the required amount of the humidified gas is increased (output of the fuel cell is increased), control can be made with the flowing passage switching means so that the dew point of the humidified gas is converged within a certain extent. As a result, a humidifier suitable for use with a fuel cell can be provided. In this instance, in view of leveling the dew point, regardless of the required amount of the humidified gas, it is preferable to control the water permeable membranes or water permeable devices so as to be operable within a center region of the graph (FIG. 13), where the dew point is stable. The "off gas" appeared in the preferred embodiment corresponds to the "moist gas", and the "dry air" and "humidified air" correspond to the "dry gas" and "humidified gas", respectively. Further, the "hollow fiber membranes" or "bundle of hollow fiber membranes" in the preferred embodiment corresponds to the "water permeable membranes", and the "hollow fiber membrane module" corresponds to the "water permeable device". The water permeable membranes may be in the form of a repeatedly folded film-like water permeable membrane or in the form of a winded roll.

According to a preferred embodiment of the present invention, each of the plurality of combined water permeable membranes or water permeable devices has a different humidifying capability.

In such a construction, the humidified gas is generated in accordance with the required amount of the humidified gas (the output of the fuel cell) so that when the required amount of the humidified gas is smaller, water permeable membranes or a water permeable device with a relatively low humidifying capability is used, and when the required amount is larger, water permeable membranes or a water permeable device with a relatively high humidifying capability is used. As a result, the dew point can be properly converged within a certain extent regardless of the required amount of the humidified gas. In the case that the water permeable membranes are hollow fiber membranes, the humidifying capability thereof can be varied by changing its profile, inner diameter, shape, length, or the material of the hollow fiber membrane. Also, the humidifying capability can be varied by changing the number of hollow fiber membranes retained in the hollow fiber membrane module or the bundle of hollow fiber membranes.

As a plurality of combined water permeable membranes or water permeable devices, the following three cases are available, in which:

(1) A plurality of water permeable devices are employed, and with the use of the flowing passage switching means, a suitable water permeable device is selected or alternatively the number of water permeable devices to be used is increased or decreased, in accordance with the required amount of the humidified gas;

(2) Only one water permeable device is employed. However, the water permeable device consists of a plurality of water permeable membranes, and with the use of the flowing passage switching means, suitable water permeable membranes are selected or alternatively the number of water permeable membranes to be used is increased or decreased, in accordance with the required amount of the humidified gas. In this instance, the moist gas and the dry gas (humidified gas) are separated by the water permeable membrane. However, a separating wall is preferably provided within the water permeable device so as to separate a gas to be flown though one water permeable membrane assembly from the other gas to be flown through the other water permeable membrane assembly; and (3) Combination use of (1) and (2).

BRIEF DESCRIPTION OF THE DRAWINGS

Preferred embodiments of the present invention will be described below, by way of example only, with reference to the accompanying drawings, in which.

DESCRIPTION OF THE PREFERRED EMBODIMENT

With reference to the drawings, preferred embodiments of a humidifier for use with a fuel cell (herein after referred to as a "humidifier") will be described. In consideration of the structure and the manner of use of a hollow fiber membrane module, the following three embodiments will be described as preferred embodiments.

<First Embodiment>

A humidifier according to a first embodiment of the invention will be described. In this embodiment, the humidifier comprises a plurality of hollow fiber membrane modules having different humidifying capabilities, and a suitable hollow fiber membrane module is selected in accordance with the output of a fuel cell (or the required amount of humidified air) with the use of flowing passage switching means.

[Fuel Cell System]

Figure 1:
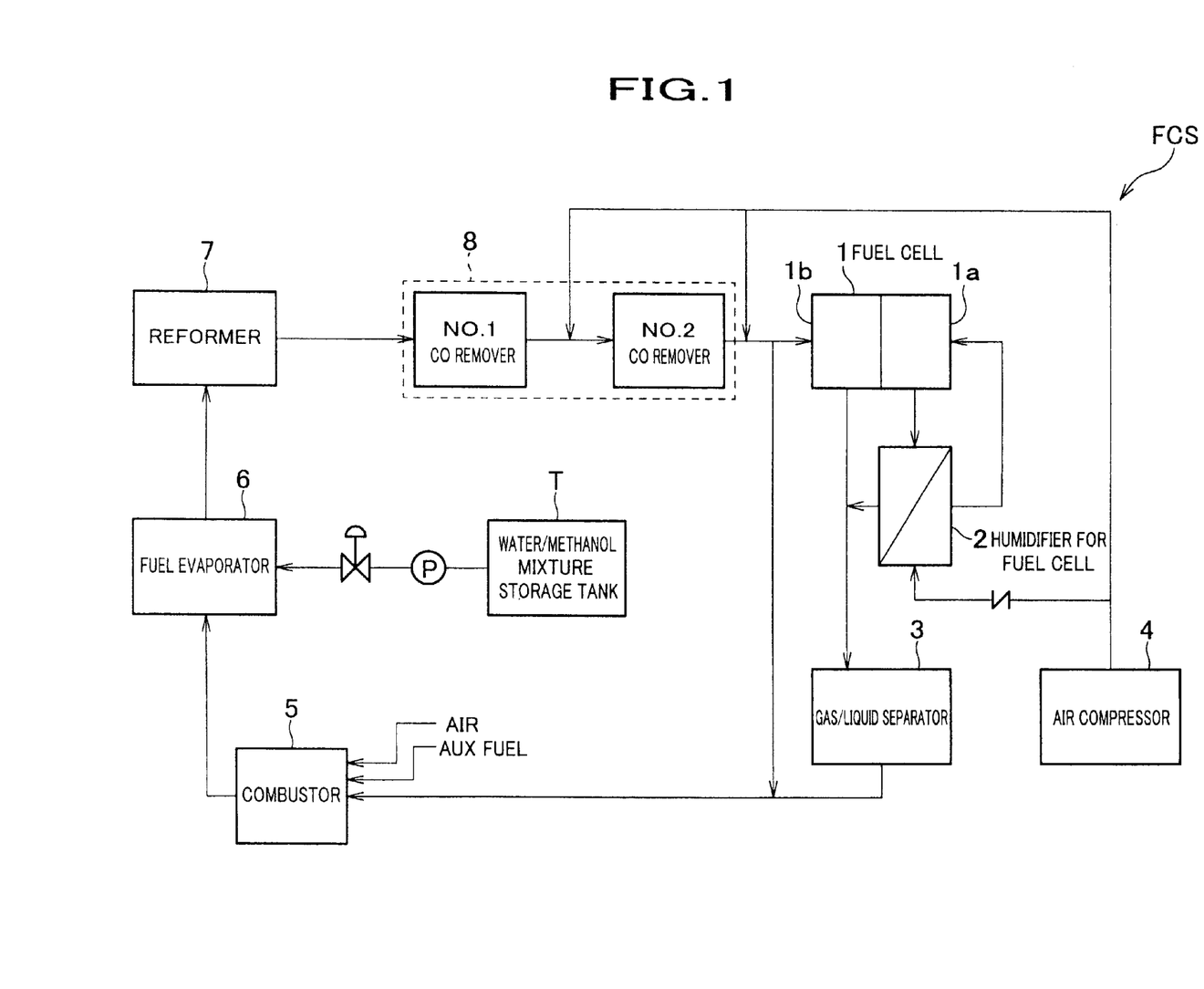
FIG. 1 illustrates the overall arrangement of a fuel cell system.

With reference to FIG. 1, the overall arrangement and operations of a fuel cell system, to which the humidifier according to a first embodiment of the invention is applied, will be described.

A fuel cell system FCS comprises a fuel cell (stack) 1, a humidifier 2, a gas/liquid separator 3, an air compressor 4, a combustor 5, a fuel evaporator 6, a reformer 7, a CO remover 8, a water/methanol mixture storage tank (hereinafter simply referred to as a "tank") T and the like. The fuel cell 1 is a solid polymer fuel cell.

In the fuel cell 1, humidified air as an oxidant gas is supplied to an oxygen pole side $1a$ and hydrogen-enriched gas as a fuel gas is supplied to a hydrogen pole side $1b$. The fuel cell 1 takes an electric energy from the chemical energy brought about due to the chemical reaction between oxygen and hydrogen to generate a power. The humidified air is brought about by compressing atmospheric air (air), which is compressed by the air compressor 4, and then humidifying the compressed air in the humidifier 2. The humidification of the dry air is carried out through the moisture-exchange between the off gas which contains a relatively large amount of water discharged out of the oxygen pole 1a and the dry air which has a relative small water content, and the details of which will be described later on. The fuel gas occurs when the mixed liquid of water and methanol, which is a raw fuel liquid, is evaporated in the fuel evaporator 6, and reformed in the reformer 7, followed by the removal of carbon oxide (CO) in the CO remover 8. The raw fuel liquid stored in the tank T is metered through a pump P to the fuel evaporator 8 at which the liquid fuel is evaporated and mixed with air for the reformation to provide a raw fuel gas, the resulting raw fuel gas is supplied to the reformer 7, and then to the CO remover 8 at which CO is removed. In the reformer 7, methanol is steam-reformed and partially oxidized in the presence of a catalyst. In the CO remover 8, CO is selectively oxidized in the presence of a catalyst to be converted into $CO_2$. In order to quickly remove decrease the concentration of carbon oxide, the CO remover is composed of two CO removers, i.e., No. 1 CO remover and No. 2 CO remover. The air compressor 4 supplies air for the selective oxidation to the CO remover 8.

The off gas containing a large amount of the produced water at the oxygen pole side 1a and the off gas containing hydrogen remaining unreacted at the hydrogen pole side 1b occur at the same time. The off gas at the oxygen pole side 1a is used for the humidification of the air in the humidifier 2 as described above, after which it is mixed with the off gas at the hydrogen pole side 1b, and the water contained therein is removed through the gas/liquid separator 3. Consequently, the off gas from which the water is removed (mixed off gas) is combusted in the combustor 5, and is used as a heat source for the fuel evaporator 6. It is noted that an auxiliary fuel (methanol etc.) and air are supplied to the combustor 5 in order to supply a deficient calorie and to warm up the fuel cell system FCS at starting.

Figure 2:
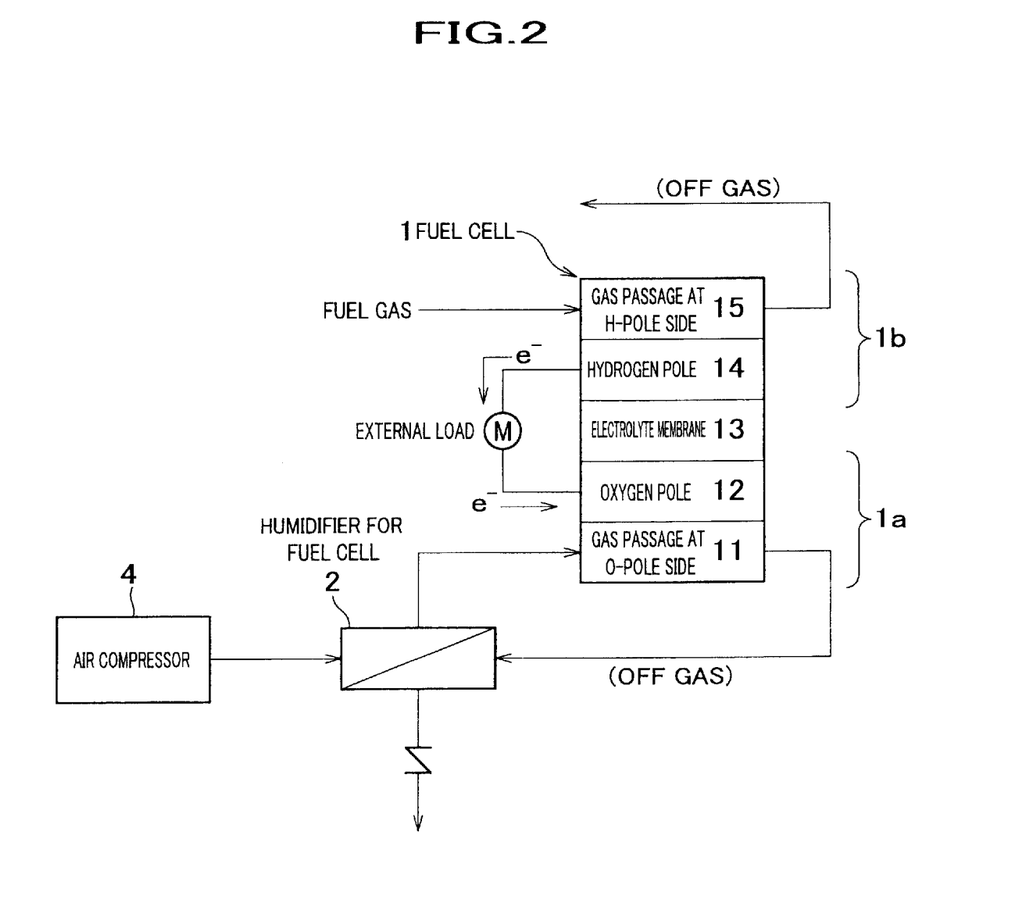
FIG. 2 is a schematic explanatory view illustrating the structure of a fuel cell.

The configuration and functions of the fuel cell will now be described by referring to FIG. 2. In FIG. 2, the fuel cell 1 is expressed as a single cell in order to simplify the configuration. (Actually, the fuel cell 1 is configured as to be a laminate having approximately 200 single cells laminated).

As shown in FIG. 2, the fuel cell 1 is divided into the hydrogen pole side 1b and the oxygen pole side 1a across a electrolyte membrane 13, and each of the poles has an electrode containing a platinum series catalyst to form a hydrogen pole 14 and an oxygen pole 12. In this figure, the diffusion layer is omitted. The hydrogen-enriched gas occurring from the raw fuel liquid is passed through a gas passage 15 at the hydrogen pole side as the fuel gas, while the humidified air humidified in the humidifier 2 is passed through a gas passage 15 at the oxygen pole side as the oxidant gas. As electrolyte membrane 13 which can be used herein, a solid macromolecular membrane, such as perfluorocarbon sulfonic acid, which is a proton-exchange membrane, has been known. The electrolyte membrane 13 has a plurality of proton-exchanging groups in the solid macromolecule, and has a low specific resistance lower than 20 U-proton at a normal temperature, when being saturated with water, serving as a proton-conductive electrolyte. Consequently, the protons produced by the ionization of hydrogen in the presence of the catalyst are easily migrated in the electrolyte membrane 13, and reach the oxygen pole 13, at which the protons are readily reacted with the oxygen ions produced from the humidified air in the presence of the catalyst to produce water. The produced water is discharged from an outlet residing at the oxygen pole side 1a of the fuel cell 1 as a moist off gas together with humidified air. At the time of the ionization of hydrogen, electrons $e^-$ are produced in the hydrogen pole 14. The produced electrons $e^-$ reach the oxygen pole 14 via an external load M such as a motor.

The reason why the humidified air is supplied to the fuel cell 1 as an oxidant gas is that power generation efficiency is decreased due to the lowered proton conductivity in the electrolyte membrane 13 if the electrolyte membrane 13 is dried. On the other hand, if the electrolyte membrane 13 is humidified in excess, the electrodes, the diffusion layers as such (typically at the oxygen pole side). Consequently, in the fuel cell system FCS utilizing the solid macromolecular type fuel cell 1, the humidification is of important meanings. The raw fuel liquid contains a large amount of water, which is used for the purpose of humidifying the hydrogen pole side 1b in addition to the reformation of the methanol in the raw fuel liquid.

Figure 3A:
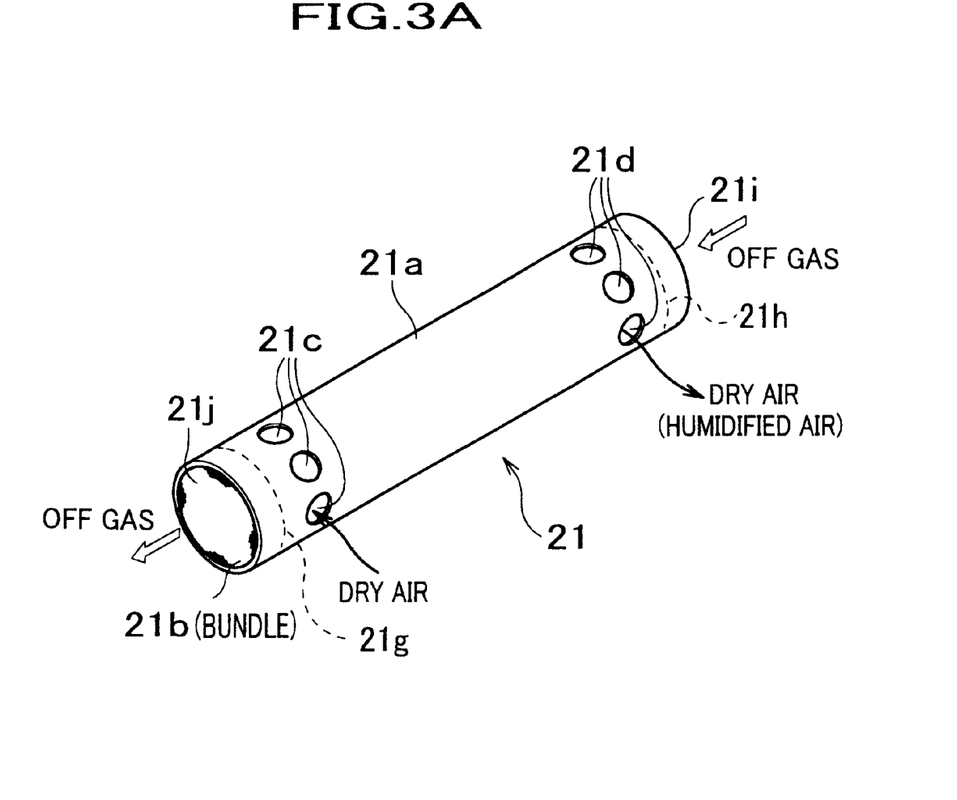
FIG. 3A is a perspective view illustrating a hollow fiber membrane module used to a humidifier.
Figure 3B:
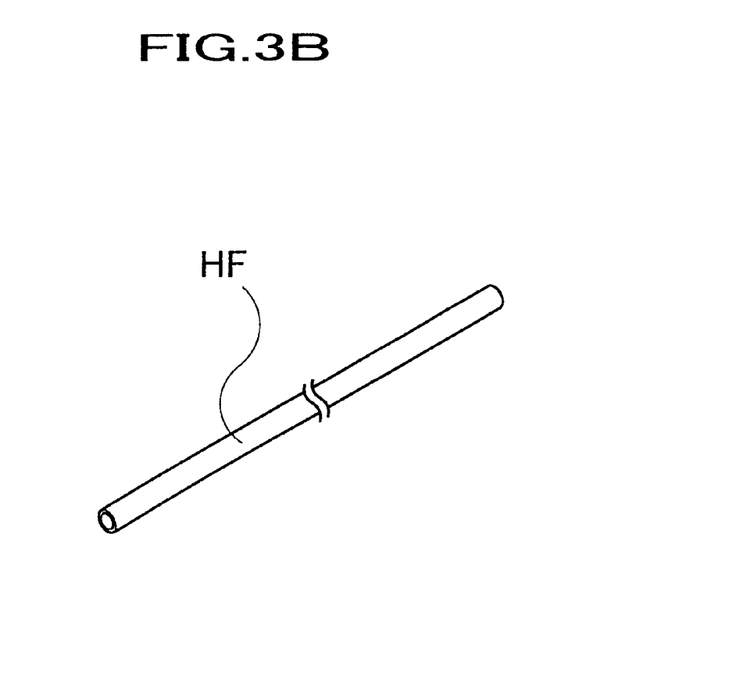
FIG. 3B is a perspective view illustrating the structure of a hollow fiber membrane.
Figure 4:
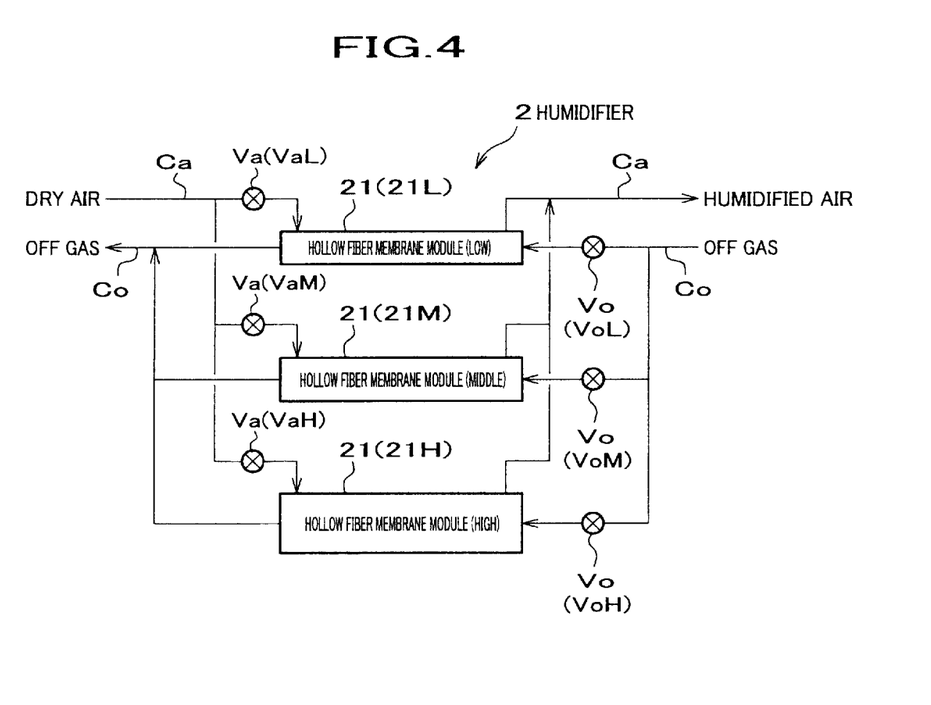
FIG. 4 is a view illustrating a humidifier according to a first embodiment of the invention.

With reference to FIGS. 3 and 4, the structure of the humidifier will be described. The humidifier 2 shown in FIG. 4 comprises hollow fiber membrane modules 21 and dry air valves Va and off gas valves Vo as flowing passage switching means. In accordance with the output of the fuel cell 1, the hollow fiber membrane modules 21 can be classified into three types, viz. a hollow fiber membrane module for low power output range 21L in which the humidifying capability is low, a hollow fiber membrane module for middle power output range 21M in which the humidifying capability is middle, and a hollow fiber membrane module for high power output range 21H in which the humidifying capability is high.

As shown in FIG. 3A, the hollow fiber membrane module 21 comprises a housing 21a and a bundle of hollow fiber membranes 21b accommodated within the housing 21a. The housing 21a is in the form of a hollow cylinder, and both ends of the housing 21a are open. The housing 21a is provided with a plurality of openings in close proximity to each end. In the illustrated embodiment, eight openings are provided along its peripheral direction. The bundle of hollow fiber membranes 21b is formed by binding several thousands to ten and several thousands of hollow fiber membranes HF, each of which has a hollow passage (FIG. 3B), in such a way that all the hollow fiber membranes HF are fixed with adhesive while retaining hollow passages at both ends of the housing 21a (outside of the openings). Reference numerals 21g and 21h indicate an adhering part between the bundle of hollow fiber membranes 21b and the housing 21a, which is a so-called potting part. With the provision of the potting parts 21g, 21h, off gas which flows through the hollow passage that is the inside of the hollow fiber membrane HF and dry air (humidified air) which flows outside of the hollow fiber membrane HF are not mixed together. In the hollow fiber membrane module 21, one end of the housing 21a is used as an off gas inlet 21i, and the other end of the housing 21a is used as an off gas outlet 21j. And the openings provided at one end of the housing 21a are used as dry air inlets 21c, while the openings provided at the other end of the housing 21a are used as humidified air outlets 21d. The hollow fiber membrane module 21 is manufactured by inserting a certain number of bundles consisting of hollow fiber membranes HF into the housing 21a, and securely fixing both end-proximate portions thereof with adhesive, and then cutting the bundle of hollow fiber membranes HF along both ends of the housing 21a.

The hollow fiber membrane HF has a great number of minute capillary tubes, which extend from its inside to its outside, and the diameter of which is several nanometers. Within the capillary tube, moisture condensation occurs easily due to decreased vapor pressure. The condensed moisture is drawn out by capillary action and water permeates the hollow fiber membrane HF from inside to outside or the reverse. This is a generous working principle of water permeation or water separation (capillary condensation type) with the use of the hollow fiber membrane HF. Specifically, off gas containing sufficient moisture is flown within the hollow fiber membrane HF, and dry air or sweep air with relatively small moisture content is flown outside of the hollow fiber membrane HF. Moisture contained in the off gas is condensed at the inside of the hollow fiber membrane HF, and the condensed moisture is supplied by capillary from the inside to the outside of the membrane HF, and at the outside of the membrane HF the dry air evaporates the moisture. Therefore, the dry air flown outside of the hollow fiber membrane HF is humidified. In the hollow fiber membrane HF, water permeation or water separation is carried out by propulsion force due to the moisture content difference between the gases flowing inside and outside of the membrane HF. Other components such as oxygen and nitrogen flow through the membrane HF, however, the permeation amount thereof is much smaller than that of water.

The water permeability of the hollow fiber membrane module 21 that is the humidifying capability becomes higher with the number of hollow fiber membranes HF included in the hollow fiber membrane module 21 (bundle of hollow fiber membranes 21b) if the material, length, diameter and the like of the hollow fiber membrane HF are constant. For this reason, the number of hollow fiber membranes HF included in the hollow fiber membrane module 21 shown in the preferred embodiments is smaller for the hollow fiber membrane module for low power output range 21L and larger for the hollow fiber membrane module for high power output range 21H, and the relation thereof is shown as the hollow fiber membrane module for low power output range 21L<the hollow fiber membrane module for middle power output range 21M<the hollow fiber membrane module for high power output range 21H. For example, the hollow fiber membrane module 21L has about five thousand hollow fiber membranes HF, the hollow fiber membrane module 21M has about ten thousand membranes HF, and the hollow fiber membrane module 21H has about fifteen thousand membranes HF, and each of the hollow fiber membranes HF is made of the same material and the size thereof is about 2 mm diameter and about 250 mm length. The humidifying capability of each hollow fiber membrane module 21L, 21M, 21H is the same as that of the prior art as shown in FIG. 13, so that the dew point of the humidified air becomes lower when the required amount of the humidified air is lower or higher.

These hollow fiber membrane modules 21L, 21M, 21H are connected in parallel relations though piping. The piping can be classified into the following two systems. One system parallelly connects the hollow fiber membrane modules 21L, 21M, 21H between the air compressor 4 and the fuel cell 1 (the oxygen pole 1a), so as to provide an air conduit Ca for supplying dry air and discharging it as humidified air. The air conduit Ca is connected between the dry air inlets 21c and the humidified air outlets 21d of the hollow fiber membrane module 21. The dry air flows into the hollow fiber membrane module 21 from the dry air inlets 21c and out from the humidified air outlets 21d as humidified air. In the hollow fiber membrane module 21, the dry air and the humidified air flow outside of the hollow fiber membrane HF.

The other system parallelly connects the hollow fiber membrane modules 21L, 21M, 21H between the fuel cell 1 (the off gas discharge port) and the gas/liquid separator 3, so as to provide an off gas conduit Co for supplying and discharging off gas. The off gas conduit Co is connected between the off gas inlet 21i and the off gas outlet 21j of the hollow fiber membrane module 21. The off gas flows into the hollow fiber membrane module 21 from the off gas inlet 21i and out from the off gas outlet 21j. In the hollow fiber membrane module 21, the off gas flows inside of the hollow fiber membrane HF.

Dry air valves Va (VaL, VaM, VaH) constituting the flowing passage switching means are provided on the air conduit Ca just before the dry air inlets 21c of each hollow fiber membrane module 21 (21L, 21M, 21H). These dry air valves VaL, VaM, VaH switch the flowing passage of the dry air. Meanwhile, off gas valves Vo (VoL, VoM, VoH) constituting, together with the dry air valves Va, the flowing passage switching means are provided on the off gas conduit Co just before the off gas inlet 21i of each hollow fiber membrane module 21 (21L, 21M, 21H). These off gas valves VoL, VoM, VoH switch the flowing passage of the off gas. In the preferred embodiments, the dry air valves Va and the off gas valves Vo are butterfly valves, which are controlled to be open and close by means of non-shown control means. The hollow fiber membrane modules 21L, 21M, 21H are selectively used in accordance with the output of the fuel cell 1.

[Operation of Humidifier]

Figure 5:
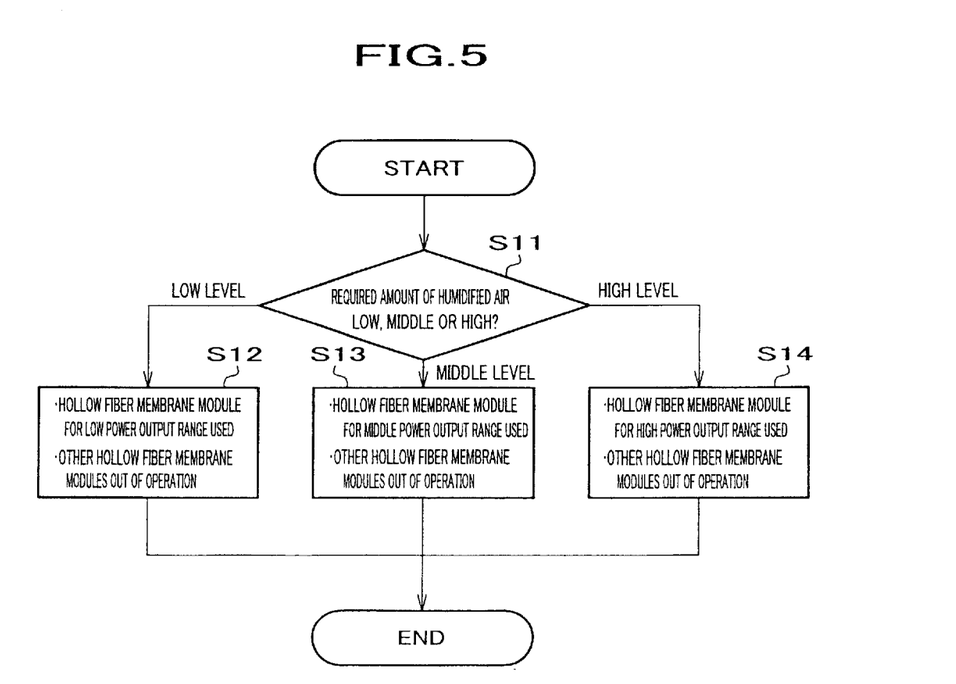
FIG. 5 is a flow chart showing the operations of the humidifier of FIG. 4.

With reference to FIGS. 1 to 5, and particularly to FIG. 5, the operations of the humidifier according to the first embodiment of the invention will be described.

Firstly, at step S11, judgement is made as to whether the required amount of the humidified air is in a low level, a middle level or a high level. The required amount of the humidified air is judged based on the output of the fuel cell such that the low level is determined in the low power output range, the middle level is determined in the middle power output range, and the high level is determined in the high power output range. Table 1 shows the relations between the output of the fuel cell and open/close condition of the valves provided in the humidifier.

TABLE 1

Relations between output of fuel cell and valve conditions of humidifier.

| | Conditions of Dry air valves | | | Conditions of Off gas valves | | |
|---|---|---|---|---|---|---|
| Output of Fuel cell | VaL | VaM | VaH | VoL | VoM | VoH |
| Low power output range | Open | Closed | Closed | Open | Closed | Closed |
| Middle power output range | Closed | Open | Closed | Closed | Open | Closed |
| High power output range | Closed | Closed | Open | Closed | Closed | Open |

When the required amount of the humidified air is in the low level, only the hollow fiber membrane module for low power output range 21L is used and other hollow fiber membrane modules 21M, 21H are out of operation. This is shown at step 12 and the conditions of the valves are indicated in Table 1. Therefore, the dry air from the air compressor 4 flows only through the hollow fiber membrane module for low power output range 21L (outside of the hollow fiber membrane HF), and is supplied to the oxygen pole 1a of the fuel cell 1 as humidified air or humidified oxidant gas. At the same time, the off gas from the oxygen pole 1a of the fuel cell 1 flows only through the hollow fiber membrane module for low power output range 21L (inside of the hollow fiber membrane HF), and is supplied to the gas/liquid separator 3.

When the required amount of the humidified air is in the middle level, only the hollow fiber membrane module for middle power output range 21M is used and other hollow fiber membrane modules 21L, 21H are out of operation. This is shown at step 13 and the conditions of the valves are indicated in Table 1. Therefore, the dry air from the air compressor 4 flows only through the hollow fiber membrane module for middle power output range 21M, and is supplied to the oxygen pole 1a of the fuel cell 1 as humidified air. At the same time, the off gas from the oxygen pole 1a of the fuel cell 1 flows only through the hollow fiber membrane module for middle power output range 21M, and is supplied to the gas/liquid separator 3.

When the required amount of the humidified air is in the high level, only the hollow fiber membrane module for high power output range 21H is used and other hollow fiber membrane modules 21L, 21M are out of operation. This is shown at step 14 and the conditions of the valves are indicated in Table 1. Therefore, the dry air from the air compressor 4 flows only through the hollow fiber membrane module for high power output range 21H, and is supplied to the oxygen pole 1a of the fuel cell 1 as humidified air. At the same time, the off gas from the oxygen pole 1a of the fuel cell 1 flows only through the hollow fiber membrane module for high power output range 21H, and is supplied to the gas/liquid separator 3.

In the first preferred embodiment, if the dew point lowers due to increased required amount of the humidified air (FIG. 13) while using the hollow fiber membrane module 21L in the low power output range, the hollow fiber membrane module 21L is stopped, and the hollow fiber membrane module 21M is operated instead, thereby retaining the dew point. A similar operation is carried out when shifting from the middle power output range to the high power output range, and the hollow fiber membrane module 21M is switched to the hollow fiber membrane module 21H in accordance with the increased required amount of the humidified air. On the contrary, if the dew point lowers due to decreased required amount of the humidified air while using the hollow fiber membrane module 21H in the high power output range, the hollow fiber membrane module 21H is stopped, and the hollow fiber membrane module 21M is operated instead, thereby retaining the dew point. A similar operation is carried out when shifting from the middle power output range to the low power output range.

The hollow fiber membrane module for low power output range 21L is a hollow fiber membrane module 21 having a prominent characteristic in that the optimal dew point is achieved when the output of the fuel cell 1 is in the low power output range. Therefore, the hollow fiber membrane module for low power output range 21L performs the optimal humidification in the low power output range, and not like the prior art humidifier, the dew point of the humidified air does not lower in the low power output range. This can be said to the hollow fiber membrane module for high power output range 21H. The hollow fiber membrane module for middle power output range 21M is a hollow fiber membrane module 21 having a prominent characteristic in that the optimal dew point is achieved when the output of the fuel cell 1 is in the middle power output range. Therefore, it performs the optimal humidification in the middle power output range, and not like the prior art humidifier, excessive humidification of the fuel cell 1 can be prevented in the middle power output range.

Accordingly, the humidifier 2 according to the first embodiment of the invention can provide a humidified air with a stable dew point to the fuel cell 1, through the entire output range of the fuel cell 1 from the low power output range to the high power output range. As a result, the fuel cell 1 can be operated under stable conditions regardless of the output of the fuel cell 1 and without occurrence of water immersion of the electrode 12 or dryness of the electrolyte membrane 13.

<Second Embodiment>

A humidifier according to a second embodiment of the invention will be described. In this embodiment, the humidifier comprises a plurality of hollow fiber membrane modules with substantially the same humidifying capability, and with the use of the flowing passage switching means, the number of hollow fiber membrane modules to be used is increased or decreased in accordance with the output of the fuel cell (or the required amount of the humidified air). Parts or elements similar to those previously described regarding the first embodiment will be denoted by the same reference numerals and the description thereof will be omitted.

[Fuel Cell System]

The fuel cell system, to which a humidifier according to the second embodiment of the invention is applied, is substantially the same as that of the first embodiment. Therefore, detailed description thereof will be omitted.

[Humidifier]

Figure 6:
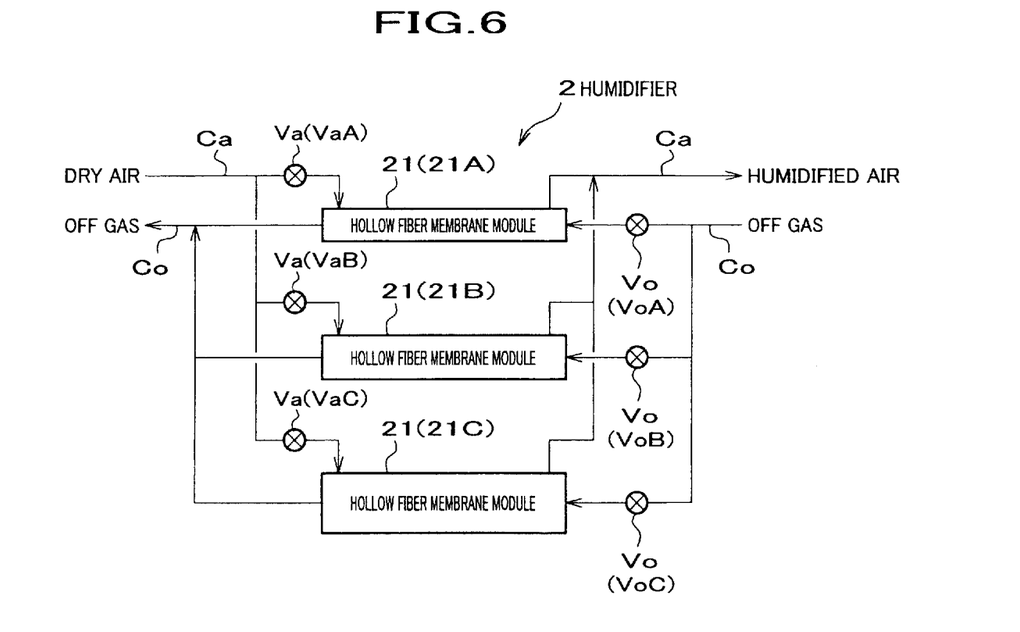
FIG. 6 is a view illustrating a humidifier according to a second embodiment of the invention.

With reference to FIG. 6, a humidifier according to the second embodiment of the invention will be described. Similar to the first embodiment, a humidifier 2 shown in FIG. 6 comprises hollow fiber membrane modules 21 and dry air valves Va and off gas valves Vo as flowing passage switching means. Not like the first embodiment, the hollow fiber membrane modules 21 consist of three hollow fiber membrane modules 21A, 21B, 21C having substantially the same humidifying capability.

Similar to the first embodiment, the hollow fiber membrane module 21 comprises a housing 21a and a bundle of hollow fiber membranes 21b (FIG. 3A). Since the structure and the working principle of the hollow fiber membrane module 21 are the same as those described in the first embodiment, further explanation will be omitted. Each of the hollow fiber membrane modules 21A, 21B, 21C includes about five thousand hollow fiber membranes HF.

These hollow fiber membrane modules 21A, 21B, 21C are connected in parallel relations through piping. This is also the same as the first embodiment, and further explanation will be omitted.

Dry air valves Va (VaA, VaB, VaC) constituting the flowing passage switching means are provided on the air conduit Ca just before the dry air inlets 21c of each hollow fiber membrane module 21 (21A, 21B, 21C). See FIG. 3A. These dry air valves VaA, VaB, VaC switch the flowing passage of the dry air. Meanwhile, as shown in FIG. 3A, off gas valves Vo (VoA, VoB, VoC) constituting, together with the dry air valves Va, the flowing passage switching means are provided on the off gas conduit Co just before the off gas inlet 21*i* of each hollow fiber membrane module 21 (21A, 21B, 21C). These off gas valves VoA, VoB, VoC switch the flowing passage of the off gas. In this embodiment, the dry air valves Va and the off gas valves Vo are butterfly valves, which are controlled to be open and close by means of non-shown control means. The number of the hollow fiber membrane modules 21A, 21B, 21C to be used is selectively increased or decreased in accordance with the output of the fuel cell 1.

[Operation of Humidifier]

Figure 7:
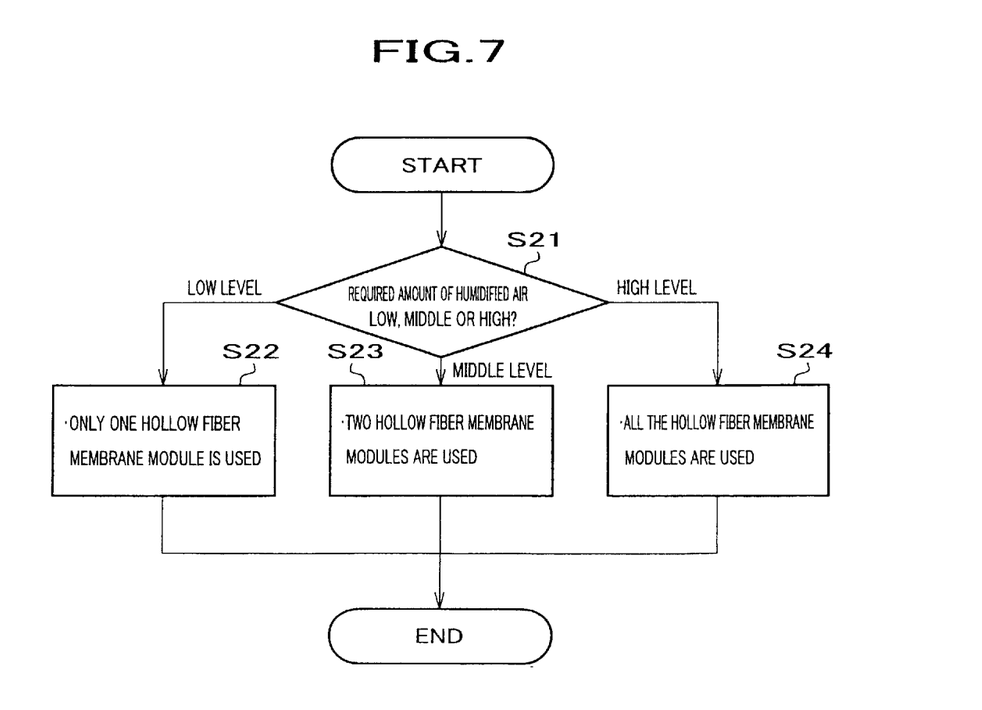
FIG. 7 is a flow chart showing the operations of the humidifier of FIG. 6.

With reference to FIG. 7 (and FIGS. 1 to 4 if necessary), the operations of the humidifier according to the second embodiment of the invention will be described.

Firstly, at step S21, judgement is made as to whether the required amount of the humidified air is in a low level, a middle level or a high level. The required amount of the humidified air is judged based on the output of the fuel cell such that the low level is determined in the low power output range, the middle level is determined in the middle power output range, and the high level is determined in the high power output range. Table 2 shows the relations between the output of the fuel cell and open/close condition of the valves provided in the humidifier.

When the required amount of the humidified air is in the high level, all the hollow fiber membrane modules 21A, 21B, 21C are used. This is shown at step 24 and the conditions of the valves are indicated in Table 2. Therefore, the dry air from the air compressor 4 flows through all the hollow fiber membrane modules 21A, 21B, 21C (outside of the hollow fiber membrane HF), and is supplied to the oxygen pole 1*a* of the fuel cell 1 as humidified air or humidified oxidant gas. At the same time, the off gas from the oxygen pole 1*a* of the fuel cell 1 flows through all the hollow fiber membrane modules 21A, 21B, 21C (inside of the hollow fiber membrane HF), and is supplied to the gas/liquid separator 3.

In the second preferred embodiment, if the dew point lowers due to increased required amount of the humidified air while using one hollow fiber membrane module 21A in the low power output range, another hollow fiber membrane module 21B is also operated, thereby retaining the dew point. A similar operation is carried out when shifting from the middle power output range to the high power output range, the total of three hollow fiber membrane modules 21 are operated in accordance with the increased required amount of the humidified air. On the contrary, if the dew point lowers due to decreased required amount of the humidified air while using all the hollow fiber membrane

TABLE 2

Relations between output of fuel cell and valve conditions of humidifier.

| Output of Fuel cell | Conditions of Dry air valves | | | Conditions of Off gas valves | | |
| --- | --- | --- | --- | --- | --- | --- |
| | VaL | VaM | VaH | VoL | VoM | VoH |
| Low power output range | Open | Closed | Closed | Open | Closed | Closed |
| Middle power output range | Open | Open | Closed | Open | Open | Closed |
| High power output range | Open | Open | Open | Open | Open | Open |

When the required amount of the humidified air is in the low level, only the hollow fiber membrane module 21A is used and other hollow fiber membrane modules 21B, 21C are out of operation. This is shown at step 22 and the conditions of the valves are indicated in Table 2. Therefore, the dry air from the air compressor 4 flows only through the hollow fiber membrane module 21A (outside of the hollow fiber membrane HF), and is supplied to the oxygen pole 1*a* of the fuel cell 1 as humidified air or humidified oxidant gas. At the same time, the off gas from the oxygen pole 1*a* of the fuel cell 1 flows only through the hollow fiber membrane module 21A (inside of the hollow fiber membrane HF), and is supplied to the gas/liquid separator 3. The hollow fiber membrane module 21A includes a number of hollow fiber membranes HF sufficient for humidifying the dry air in the low power output range.

When the required amount of the humidified air is in the middle level, two hollow fiber membrane modules 21A, 21B are used and the other hollow fiber membrane module 21C is out of operation. This is shown at step 23 and the conditions of the valves are indicated in Table 2. Therefore, the dry air from the air compressor 4 flows through the two hollow fiber membrane modules 21A, 21B (outside of the hollow fiber membrane HF), and is supplied to the oxygen pole 1*a* of the fuel cell 1 as humidified air or humidified oxidant gas. At the same time, the off gas from the oxygen pole 1*a* of the fuel cell 1 flows through the two hollow fiber membrane modules 21A, 21B (inside of the hollow fiber membrane HF), and is supplied to the gas/liquid separator 3.

modules 21A, 21*b*, 21C in the high power output range, the hollow fiber membrane module 21C is stopped, thereby retaining the dew point. A similar operation is carried out when shifting from the middle power output range to the low power output range, and the number of the hollow fiber membrane modules 21 to be used is reduced to one in accordance with the decreased required amount of the humidified air.

Accordingly, the humidifier 2 according to the second embodiment of the invention can provide a humidified air with a stable dew point to the fuel cell 1, through the entire output range of the fuel cell 1 from the low power output range to the high power output range. As a result, the fuel cell 1 can be operated under stable conditions regardless of the output of the fuel cell 1.

Further, according to the second embodiment, a plurality of hollow fiber membrane modules 21A, 21B, 21C are used in the middle power output range and the high power output range, therefore, not like the prior art humidifier utilizing one hollow fiber membrane module, the dry air or the humidified air flowing through the hollow fiber membrane module 21 is unlikely to cause a drift, even if the number of hollow fiber membranes HF is increased. This leads to improvement of humidifying capability of the humidifier 2, because the extensive surface area of the outer surface of the hollow fiber membrane HF can be used effectively.

Figure 8:
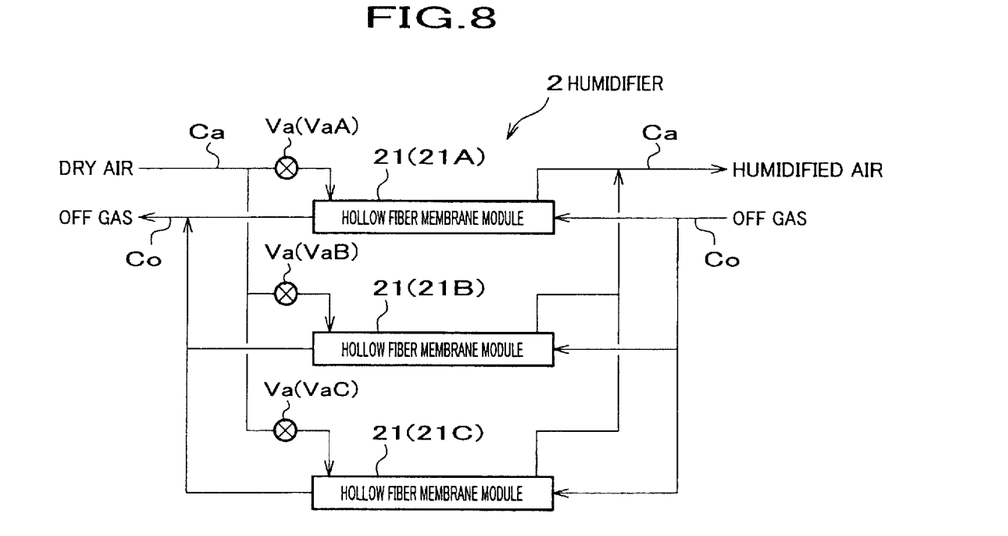
FIG. 8 is a view illustrating a modified humidifier according to the second embodiment of the invention.

In the second embodiment, as shown in FIG. 8, only dry air valves Va are provided as the flowing passage switching means, and off gas valves Vo may be removed. In this arrangement, the structure of the humidifier 2 can be simplified. Here, all the hollow fiber membrane modules 21A, 21B, 21C are at all times supplied with the off gas, regardless of the output of the fuel cell 1. However, because the off gas contains sufficient moisture, the dew point of the humidified air does not drop defectively.

<Third Embodiment>

A humidifier according to a third embodiment of the invention will be described. In this embodiment, one hollow fiber membrane module is separated by separating walls, and with the use of flowing passage switching means, the number of hollow fiber membranes to be used is increased or decreased in accordance with the output of the fuel cell or the required amount of the humidified air. Parts or elements similar to those previously described regarding the first and the second embodiments will be denoted by the same reference numerals and the description thereof will be omitted.

[Fuel Cell System]

The fuel cell system, to which a humidifier according to the third embodiment of the invention is applied, is substantially the same as that of the first embodiment. Therefore, detailed description thereof will be omitted.

[Humidifier]

Figure 9:
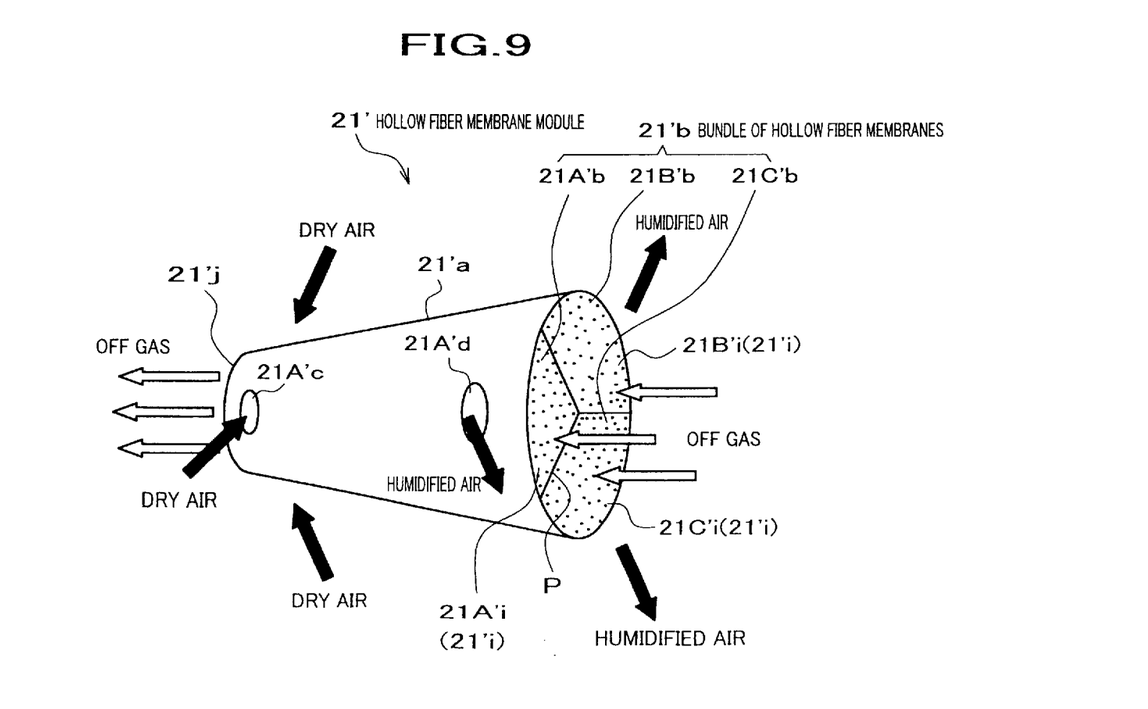
FIG. 9 is a schematic perspective view illustrating the structure of a hollow fiber membrane module used for a humidifier according to a third embodiment of the invention.

With reference to FIG. 9, a humidifier according to the third embodiment of the invention will be described. Similar to the first embodiment, a humidifier 2' shown in FIGS. 9 and 10 comprises a hollow fiber membrane module 21' and dry air valves Va and off gas valves Vo as flowing passage switching means. However, the hollow fiber membrane module 21' of the humidifier 2' is separated into three sections by separating walls P. In other words, the hollow fiber membrane module 21' according to the third embodiment of the invention comprises three bundles of hollow fiber membranes 21'*b* (21A'*b*, 21B'*b*, 21C'*b*). Therefore, dry airs or humidified airs flowing through the separated bundles of hollow fiber membranes 21A'*b*, 21B'*b*, and 21C'*b* do not mix together within the housing 21'*a*. The working principle of the hollow fiber membrane HF is the same as that of the first embodiment, and the description thereof will be omitted.

The housing 21'*a* of the humidifier 2' is in the form of a frustum conical, and the diameter thereof gradually increases from one side to the other. The distance between the hollow fiber membranes HF of the bundle of hollow fiber membranes 21'*b* also increases gradually from one side to the other (viz. the hollow fiber membranes HF are disposed in a radial fashion). The number of hollow fiber membranes HF of each bundle of hollow fiber membranes 21A'*b*, 21B'*b*, and 21C'*b* is constant (viz. five thousands membranes). The humidifying capability of each bundle of hollow fiber membranes 21A'*b*, 21B'*b*, and 21C'*b* is substantially the same (although it may be different).

These bundles of hollow fiber membranes 21A'*b*, 21B'*b*, and 21C'*b* are parallelly connected by piping and non-shown head covers. Similar to the first embodiment, the piping system includes an air conduit Ca and an off gas conduit Co. Further, similar to the first and the second embodiments, the dry air (humidified air) counter-flows against the off gas.

When considering the bundle of hollow fiber membranes 21A'*b*, the dry air flows from a dry air inlet 21A'*c* provided at a left side of the hollow fiber membrane module 21' shown in FIG. 9 and into the bundle of hollow fiber membranes 21A'*b* while flowing outside of each hollow fiber membrane, and is discharged as humidified air from a humidified air outlet 21A'*d* at a right side of the hollow fiber membrane module 21'. Meanwhile, the off gas flows from an off gas inlet 21A'*i* provided at a right side of the hollow fiber membrane module 21' shown in FIG. 9 and into the bundle of hollow fiber membranes 21A'*b* while flowing inside of each hollow fiber membrane, and is discharged from an off gas outlet 21'*j* at a left side of the hollow fiber membrane module 21'.

When considering the bundle of hollow fiber membranes 21B'*b*, the dry air flows from a dry air inlet (not shown) provided at the left side of the hollow fiber membrane module 21' shown in FIG. 9 and into the bundle of hollow fiber membranes 21B'*b* while flowing outside of each hollow fiber membrane, and is discharged as humidified air from a humidified air outlet (not shown) at the right side of the hollow fiber membrane module 21'. Meanwhile, the off gas flows from an off gas inlet 21B'*i* provided at the right side of the hollow fiber membrane module 21' shown in FIG. 9 and into the bundle of hollow fiber membranes 21B'*b* while flowing inside of each hollow fiber membrane, and is discharged from the off gas outlet 21'*j* at the left side of the hollow fiber membrane module 21'.

Further, when considering the bundle of hollow fiber membranes 21C'*b*, the dry air flows from a dry air inlet (not shown) provided at the left side of the hollow fiber membrane module 21' shown in FIG. 9 and into the bundle of hollow fiber membranes 21C'*b* while flowing outside of each hollow fiber membrane, and is discharged as humidified air from a humidified air outlet (not shown) at the right side of the hollow fiber membrane module 21'. Meanwhile, the off gas flows from an off gas inlet 21C'*i* provided at the right side of the hollow fiber membrane module 21' shown in FIG. 9 and into the bundle of hollow fiber membranes 21C'*b* while flowing inside of each hollow fiber membrane, and is discharged from the off gas outlet 21'*j* at the left side of the hollow fiber membrane module 21'.

During this time, the off gas humidifies the dry air. However, each of the dry airs (humidified airs) and off gases flowing through the bundles of hollow fiber membranes 21'*b* (21A'*b*, 21B'*b*, 21C'*b*) are separated by the separating walls P and thereby do not mix together.

Figure 10:
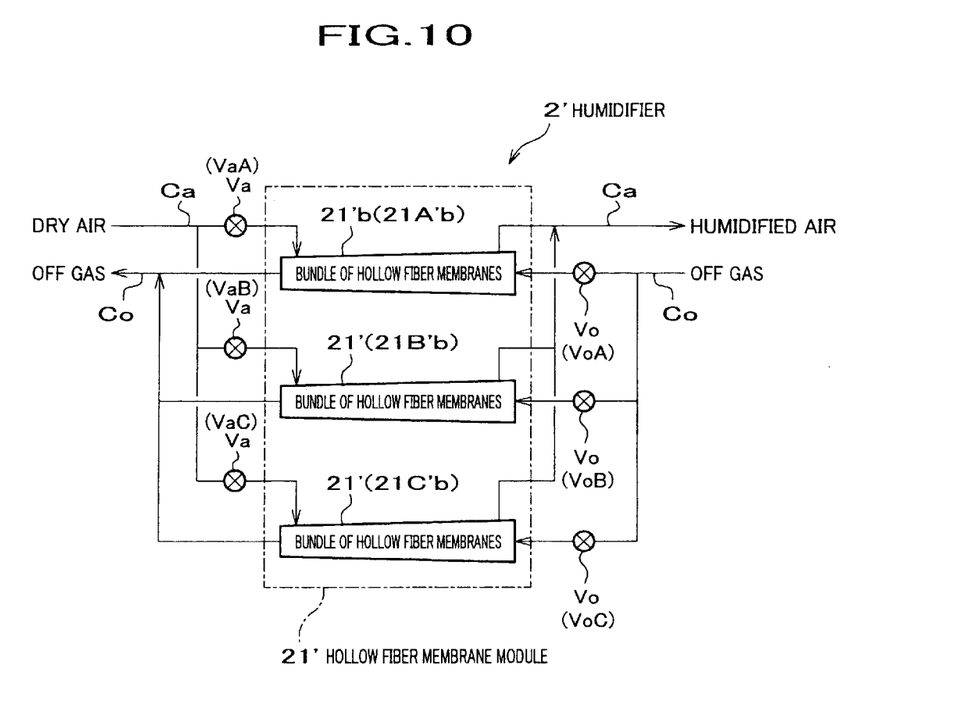
FIG. 10 is a view illustrating the humidifier according to the third embodiment of the invention.

As shown in FIG. 10, dry air valves Va (VaA, VaB, VaC) constituting the flowing passage switching means are provided on the air conduit Ca just before the dry air inlets (only 21'Ac is shown) of each bundle of hollow fiber membranes 21'*b* (21A'*b*, 21B'*b*, 21C'*b*). These dry air valves VaA, VaB, and VaC switch the flowing passage of the dry air. Meanwhile, off gas valves Vo (VoA, VoB, VoC) constituting, together with the dry air valves Va, the flowing passage switching means are provided on the off gas conduit Co just before the off gas inlet 21'*i* (21A'*i*, 21B'*i*, 21C'*i*) of each bundle of hollow fiber membranes 21'*b* (21A'*b*, 21B'*b*, 21C'*b*). These off gas valves VoA, VoB, and VoC switch the flowing passage of the off gas. In this embodiment, the dry air valves Va and the off gas valves Vo are butterfly valves. Similar to the second embodiment, these valves are controlled to be open and close by means of non-shown control means.

[Operation of Humidifier]

Figure 11:
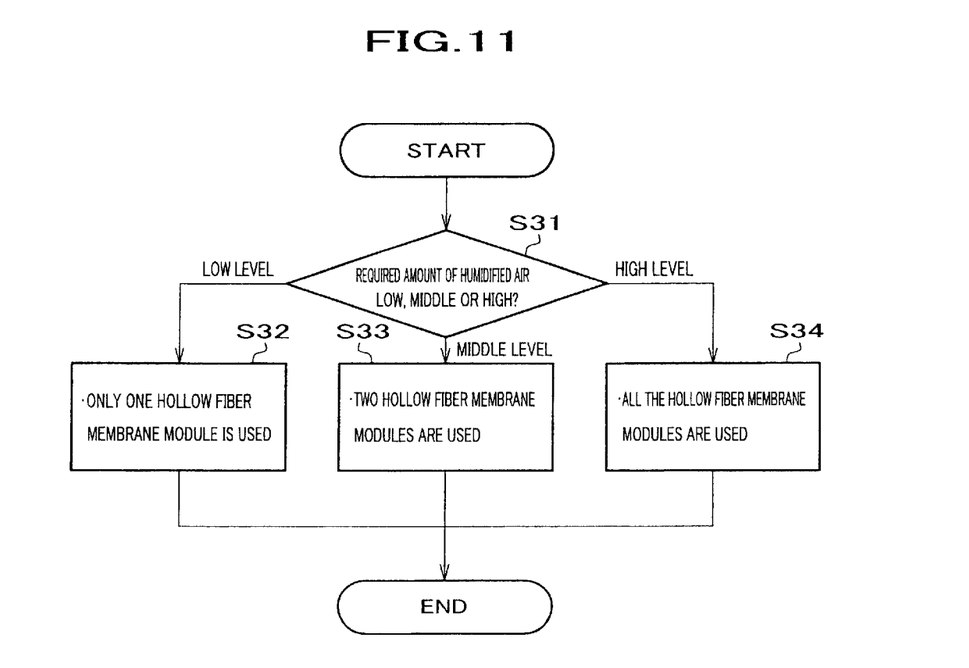
FIG. 11 is a flowchart showing the operations of the humidifier of FIG. 10.

With reference to FIG. 11 (and FIGS. 1 to 3 if necessary), the operations of the humidifier according to the third embodiment of the invention will be described.

Firstly, at step S31, judgement is made as to whether the required amount of the humidified air is in a low level, a middle level or a high level. The required amount of the humidified air is judged based on the output of the fuel cell such that the low level is determined in the low power output range, the middle level is determined in the middle power output range, and the high level is determined in the high power output range. The relations between the output of the fuel cell and open/close condition of the valves provided in the humidifier refer to Table 2 of the second embodiment.

When the required amount of the humidified air is in the low level, only the bundle of hollow fiber membranes 21A′b is used and other bundles of hollow fiber membranes 21B′b, 21C′b are out of operation. This is shown at step 32 and the conditions of the valves are indicated in Table 2. Therefore, the dry air from the air compressor 4 flows only through the bundle of hollow fiber membranes 21A′b (outside of the hollow fiber membrane HF), and is supplied to the oxygen pole 1a of the fuel cell 1 as humidified air or humidified oxidant gas. At the same time, the off gas from the oxygen pole 1a of the fuel cell 1 flows only through the one bundle of hollow fiber membranes 21A′b (inside of the hollow fiber membrane HF), and is supplied to the gas/liquid separator 3. The bundle of hollow fiber membranes 21A′b includes a number of hollow fiber membranes HF sufficient for humidifying the dry air in the low power output range.

When the required amount of the humidified air is in the middle level, two bundles of hollow fiber membranes 21A′b, 21B′b are used and the other bundle of hollow fiber membranes 21C′b is out of operation. This is shown at step 33 and the conditions of the valves are indicated in Table 2. Therefore, the dry air from the air compressor 4 flows through the two bundles of hollow fiber membranes 21A′b, 21B′b (outside of the hollow fiber membrane HF), and is supplied to the oxygen pole 1a of the fuel cell 1 as humidified air or humidified oxidant gas. At the same time, the off gas from the oxygen pole 1a of the fuel cell 1 flows through the two bundles of hollow fiber membranes 21A′b, 21B′b (inside of the hollow fiber membrane HF), and is supplied to the gas/liquid separator 3.

When the required amount of the humidified air is in the high level, all the bundles of hollow fiber membranes 21A′b, 21B′b, and 21C′b are used. This is shown at step 24 and the conditions of the valves are indicated in Table 2. Therefore, the dry air from the air compressor 4 flows through all the bundles of hollow fiber membranes 21A′b, 21B′b, and 21C′b (outside of the hollow fiber membrane HF), and is supplied to the oxygen pole 1a of the fuel cell 1 as humidified air or humidified oxidant gas. At the same time, the off gas from the oxygen pole 1a of the fuel cell 1 flows through all the bundles of hollow fiber membranes 21A′b, 21B′b, and 21C′b (inside of the hollow fiber membrane HF), and is supplied to the gas/liquid separator 3.

In the third embodiment, the required amount of the humidified air is thereby satisfied. Here, in the low power output range, because only one bundle of hollow fiber membranes 21′b is used, effective humidification is carried out. Therefore, not like the prior art humidifier, the dew point of the humidified air does not drop in the low power output range. In the high power output range, because all the three bundles of hollow fiber membranes 21A′b, 21B′b, and 21C′b are used, not like the prior art humidifier, the dew point of the humidified air does not drop in the high power output range. This is the same as the second embodiment.

Accordingly, the humidifier 2′ according to the third embodiment of the invention can provide a humidified air with a stable dew point to the fuel cell 1, through the entire output range of the fuel cell 1 from the low power output range to the high power output range. As a result, the fuel cell can be operated under stable conditions regardless of the output of the fuel cell 1.

Further, according to the third embodiment, humidification is carried out by the three bundles of hollow fiber membranes 21A′b, 21B′b, and 21C′b separated by the separating walls P, therefore, not like the prior art humidifier utilizing one bundle of hollow fiber membranes, the dry air or the humidified air flowing through the bundle of hollow fiber membranes 21′b is unlikely to cause a drift. This leads to improvement of humidifying capability of the humidifier 2′, because the extensive surface area of the outer surface of the hollow fiber membrane HF can be used effectively.

Furthermore, according to the third embodiment, the humidifier 2′ is constructed in such a way that the distance between the hollow fiber membranes HF becomes narrower at the proximity of the humidified air outlet. This leads to effective humidification due to decreased pressure loss of the humidified air (dry air), viz. a drift of the humidified air is not likely to occur.

While the invention has been described in detail and with reference to specific embodiments thereof, it will be apparent to one skilled in the art that various changes and modifications can be made therein without departing from the spirit and scope thereof.

For example, dry air or humidified air may flow inside of the hollow fiber membrane, while off gas flows outside of the hollow fiber membrane. Further, the number of hollow fiber membrane modules or bundles of hollow fiber membranes (hereinafter referred to as "hollow fiber membrane modules and the like") is not limited to three, and two or more than four hollow fiber membrane modules and the like may be employed. As increasing the number of hollow fiber membrane modules and the like, an optimum humidification corresponding to different outputs of the fuel cell is carried out. The number of hollow fiber membranes maybe optionally varied. Furthermore, the water permeable membrane is not limited to a hollow fiber membrane, it maybe in the form of a repeatedly folded film-like water permeable membrane or in the form of a winded roll.

In the preferred embodiments, the dry air (humidified air) and the off gas flow through the hollow fiber membrane module in a counter-flow fashion. However, the dry air (humidified air) and the off gas may flow parallelly.

Counter-flowing the dry air and the off gas is advantageous because the humidity concentration difference within the hollow fiber membranes can be equalized and thus the water permeability thereof can be improved. Further, opposing layout of the gas inlet and the gas outlet facilitates arrangement of the gas piping. Further, because heat exchanger effectiveness through the hollow fiber membrane is improved, cooling performance of the gas is improved. Furthermore, because of the higher heat exchanger effectiveness, the outlet temperature of the dry air is easily adjustable to the outlet temperature of the off gas, and thereby the temperature adjustment is facilitated. This facilitates management of the humidity of the air supplied to the fuel cell.

Meanwhile, parallel-flowing the dry air and the off gas is advantageous because the humidity concentration difference at the inlet is higher and the humidifying capability is improved, the overall length of the hollow fiber membrane per se can be reduced, which leads to reduced size of the device. Further, because the size of the device is reduced, the hollow fiber membranes are easily bundled in line, leading to reduced cost. Furthermore, because heat exchanger effectiveness of the dry air is lower, the temperature of the gas supplied to the fuel cell can be set higher when the output of the fuel cell is higher. Therefore, effectiveness of the fuel cell can be improved.

Temperature adjustment function of the humidifier will be described additionally.

For example, the dry air compressed by an air compressor such as a supercharger changes its temperature in the range of approximately from 30° C. (when idling the fuel cell) to 120° C. (at the maximum output of the fuel cell). Meanwhile, the fuel cell is operated at a temperature of approximately 80° C. under control of the temperature, and the off gas is discharged at a temperature of 80° C. and a little more. When flowing this off gas and the dry air compressed by the air compressor into the humidifier, thermal transfer as well as moisture transfer occurs through the hollow fiber membrane. As a result, the dry air is supplied to the fuel cell as a humidified air having a temperature close to the off gas that is a stable temperature close to the operating temperature of the fuel cell. In other words, when the output of the fuel cell is lower, such as in the idling time, the dry air is humidified and heated through the humidifier and is supplied to the fuel cell, however, when the output of the fuel cell is higher, such as in the maximum output of the fuel cell, the dry air is humidified and cooled through the humidifier and is supplied to the fuel cell as a humidified air within a stable temperature range. Therefore, with the temperature adjustment function of the humidifier, the fuel cell is operated under appropriate temperatures, leading to increased generation efficiency.

Further, when an inter-cooler is mounted at an exhaust side of the air compressor, the dry air compressed by the air compressor is cooled or heated, and changes its temperature in the range of approximately from 50° C. (when idling the fuel cell) to 60° C. (at the maximum output of the fuel cell). If the dry air passing through the inter-cooler is flown through the humidifier, where the off gas (having a temperature of 80° C. and a little more) flows, the dry air is humidified and heat-adjusted (heated) through the hollow fiber membrane and is supplied to the fuel cell as a humidified air having a temperature close to the off gas that is a stable temperature close to the operating temperature of the fuel cell. Therefore, even if an inter-cooler is mounted, with the temperature adjustment function of the humidifier, the fuel cell is operated under appropriate temperatures, leading to increased generation efficiency.

Further, similar to the third embodiment, the humidifiers in the first and the second embodiments may be constructed in such a way that the distance between the hollow fiber membranes increases gradually (and for example radically) from one end of the housing to the other. Moreover, in the second and the third embodiments, a timer and the like may be employed so as to switch between three hollow fiber membrane modules (bundles of hollow fiber membranes) in a way that all the hollow fiber membrane modules (bundles of hollow fiber membranes) are evenly used and one particular hollow fiber membrane module (bundle of hollow fiber membrane) is not continuously used. This ensures extended life of the humidifier as a whole.

Additionally, the first, the second and the third embodiments maybe optionally combined. For example, in the first embodiment, the hollow fiber membrane module for high power output range or the like may be separated by separating walls so that a plurality of bundles of hollow fiber membranes are accommodated therein, or alternatively, a plurality of hollow fiber membrane modules may be used for high power output range. In the third embodiment, the number of hollow fiber membranes included in each bundle of hollow fiber membranes may vary, such as in the first embodiment.

The humidifier according to the present invention may be applicable to other purposes, and therefore the use of the humidifier is not limited to the fuel cell.

If moisture condensation occurs in the hollow fiber membrane modules and the like at a part of the housing, where the dry air or the humidified air flows, the outer surface area of the hollow fiber membranes will not be used effectively. For this reason, the humidified air is preferably drained out from a bottom part of the hollow fiber membrane module so as to prevent moisture condensation within the housing. With this arrangement, because condensed moisture together with the humidified air is drained out from the housing, occurrence of moisture condensation can be prevented. Preferably, the drained water is collected by a catch tank or the like, and is reused in other systems.

What is claimed is:

1. A humidifier for use with a fuel cell, comprising:

a plurality of combined water permeable membranes or water permeable devices, each of the water permeable membrane or water permeable devices generating humidified gas by flowing therein different gases with different moisture contents and by moisture exchanging between the different gases so that one dry gas with smaller moisture content is humidified with the other moist gas with larger moisture content; and flowing passage switching means for optionally switching flowing passages of said dry gas;

wherein said flowing passage switching means switches the flowing passage in accordance with a required amount of said humidified gas so as to selectively use particular water permeable membranes or a particular water permeable device from among the plurality of water permeable membranes or water permeable devices.

2. A humidifier according to claim 1, wherein each of said plurality of combined water permeable membranes or water permeable devices has a different humidifying capability.

3. A humidifier according to claim 1, wherein each of said water permeable membranes or water permeable devices has substantially the same humidifying capability, and the number of combined water permeable membranes or water permeable devices to be used is increased or decreased in accordance with the required amount of said humidified gas.

4. A humidifier according to claim 1, wherein each of said water permeable devices is separated by a separating wall so as to prevent the dry gases flowing through the humidifier from being mixed together.

5. A humidifier according to claim 1, wherein said flowing passage switching means is formed by a plurality of butterfly valves.

6. A humidifier according to claim 1, wherein the distance between the water permeable membranes increases from one side of the membrane to the other, or said each water permeable device has a profile such that the cross section thereof increases from one end to the other.

7. A humidifier according to claim 3, wherein a particular water permeable membranes or a particular water permeable device, which is used when the required amount of said humidified gas is small, is switched so as to prevent a continuous use of said particular water permeable membranes or said particular water permeable device and to use all the water permeable membranes or water permeable devices evenly.

8. A humidifier according to claim 1, wherein said dry gas counter-flows against said moist gas.

9. A humidifier according to claim 1, wherein said dry gas and said moist gas flows parallelly.

* * * * *